Aug. 5, 1941.    C. COLLINS    2,251,867
PLANT CAN SPLITTING DEVICE
Filed June 25, 1940
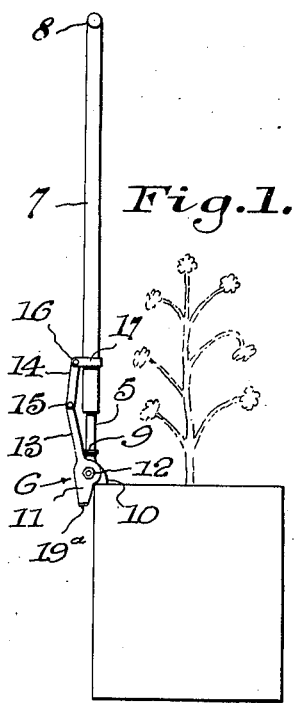
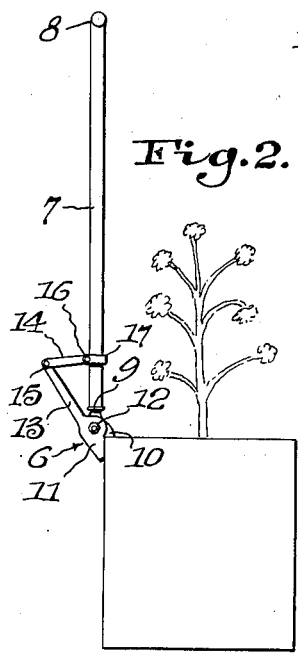
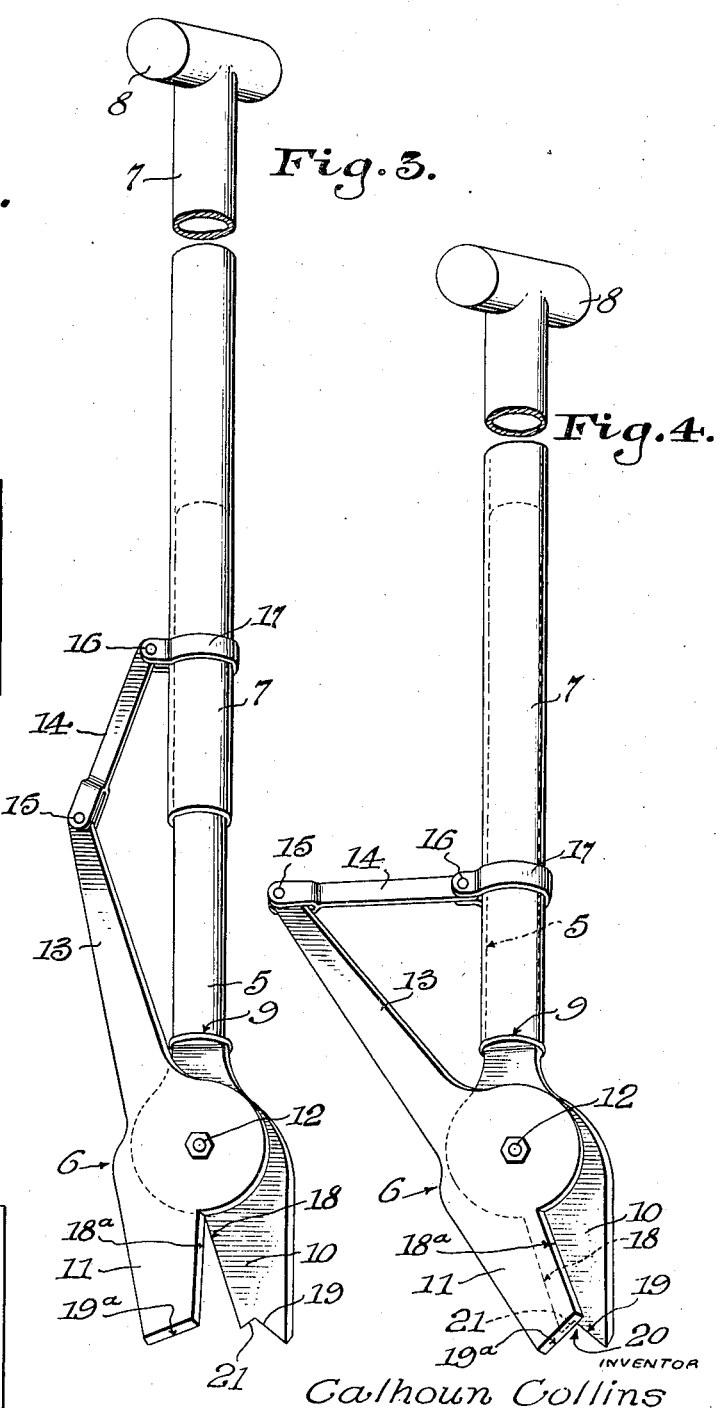
INVENTOR
Calhoun Collins Patented Aug. 5, 1941

2,251,867

UNITED STATES PATENT OFFICE 2,251,867

PLANT CAN SPLITTING DEVICE

Calhoun Collins, Bakersfield, Calif., assignor of forty per cent to California Pacific Service, Inc., Bakersfield, Calif., a corporation of California, and twenty per cent to Theodore M. Ryerson, Bakersfield, Calif.

Application June 25, 1940, Serial No. 342,371

5 Claims. (Cl. 30—246)

The invention relates to improvements in shears for cutting sheet metal and other sheet materials, and the present disclosure of the invention is a hand-operated tool for vertically splitting sheet metal cans in which plants have been started, permitting the cans to be readily separated from the earth and roots without seriously disturbing the former or injuring the latter.

One object of the invention is to provide a tool of the class described in which initial downward movement of a hand-actuated operating member, will snip an initial slit through the the metal of the can or the like, and downward forcing of the entire tool by means of said operating member, will downwardly continue said slit, it being thus possible with one hand to quickly and easily perform the desired operation. Moreover, with a tool of sufficient length, the can splitting or similar operation may be performed without stooping.

Another object of the invention is to provide a tool of the class described which is exceptionally simple and inexpensive, yet will be efficient and desirable for all standpoints.

A still further aim is the provision of a pair of shears, regardless of how operated, having one set of cooperable longitudinal cutting edges, to snip an initial slit through one edge of a piece of sheet material as the shears are closed, and another set of cooperable cutting edges for continuing the initial slit when said shears are pushed endwise, whereby a slit of desired length may be formed by first closing the shears and then pushing the same endwise.

With the foregoing in view, the invention resides in the novel subject matter hereinafter described and claimed, description being accomplished by reference to the accompanying drawing.

Figure 1 is a side elevation of the tool and a vertical section of a plant can showing the tool in readiness to first snip and then split said can.

Figure 2 is a view similar to Fig. 1 but illustrating the fact that the shears have been closed to perform their snipping operation by the initial downward movement of the operating member.

Figure 3 is a perspective view showing the shears open and in readiness for use.

Figure 4 is a perspective view showing the shears closed and in readiness for downward forcing to perform a splitting operation.

The construction illustrated will be rather specifically described, with the understanding, however, that variations may be made within the scope of the invention as claimed.

I provide a shank 5 having shears 6 at its lower end, and upon said shank, I mount an operating member 7 for vertical movement. Both the shank 5 and the operating member 7 may be of tubular form and the latter may slidably surround the former as shown. The upper end of the operating member 7 is preferably provided with a hand grip 8 to be grasped in one hand to first effect downward sliding of said operating member 7 on the shank 5 and to then force the entire tool downwardly. The downward movement of the operating member 7 on the shank 5 may be limited by any preferred stop, an example of which is shown at 9, and provision is made whereby the downward sliding of said operating member 7 to the limit dictated by said stop 9 will effect closing of the shears 6. Moreover, in the present disclosure, the shears are so constructed that the closing movement thereof will cut an initial slit in the upper end of the metal or the like being cut, and downward forcing of the tool with respect to the metal will then downwardly continue said initial slit to form a slit of desired length.

In the preferred form of construction, the shears 6 embody one blade 10 suitably secured to and offset from the shank 5, and a second blade 11 pivoted to the blade 10 as shown at 12, said blade 11 being provided with an operating arm 13, the upper end of which is horizontally spaced from the shank 5 and operating member 7. A link 14 is pivoted at its lower end to the upper end of arm 13, as shown at 15, the upper end of said link being pivoted at 16 to the operating member 7. In the present showing, a clamp 17 surrounds and is secured to the operating member 7, and the link 14 is pivoted at 16 to said clamp. The three pivots 16, 15 and 12 are so related that when the operating member 7 is downwardly slid upon the shank 5, the link 14 swings the arm 13 outwardly, thereby closing the movable blade 11.

The blades 10 and 11 are provided with longitudinal cutting edges 18 and 18$^a$ respectively, which edges are preferably, although not necessarily straight. These edges 18 and 18$^a$ form the initial slit in the metal as the shears are closed. The lower ends of the blades 10 and 11 are formed with short cutting edges 19 and 19$^a$ respectively, which edges are at obtuse angles to the aforesaid edges 18 and 18$^a$. When the blades are fully closed as seen in Figs. 2 and 4, these edges 19 and 19a cooperate in forming an inverted V-shaped cutter 20 for continuing the initial slit when the tool is forced endwise. It is preferable but not entirely essential that the blade 10 be provided with another short cutting edge 21 at the upper end of the cutting edge 19 and extending to the edge 18. If the blade 11 be somewhat shorter than shown, the two diverging edges 19 and 21 may serve as the sole cutting means for downwardly continuing the initial slit after this slit is formed by the longitudinal edges 18 and 18a, and it will be observed that said edge 21 will pass through said initial slit as said edges 18 and 18a complete said initial slit.

An explanation of operation with respect to the invention when embodied in the form of a plant can splitting tool, will suffice for all forms in which the invention may be embodied. The tool is initially placed on the edge of a can as shown in Fig. 1. The operating member 7 is then slid downwardly upon the shank 5, causing closing of the shears 6 to snip an initial slit through the upper end of the can wall. Continued downward pushing on the operating member then forces the entire tool downwardly, causing the V-shaped cutter 20 to continue the initial slit downwardly, forming a slit of desired length. When the tool is again lifted, the weight of the shears and the shank 5 restores the parts to normal position as seen in Fig. 3.

I claim:

1. A can splitting tool comprising an elongated vertically disposed shank, relatively fixed and pivoted downwardly projecting shear blades carried by the lower end of said shank, said blades having cutting edges to initially snip a slit through the upper end of the can wall when said blades are closed and to then downwardly continue this initial slit when the closed blades are forced downwardly, an elongated operating member disposed vertically and mounted to slide vertically on said vertically disposed shank, and means connecting said operating member with the pivoted shear blade to close the shears as said operating member is slid downwardly on said shank, said operating member having a rigid hand grip for first sliding said operating member downwardly on said shank to close said shears and cause them to form said initial slit through the can wall, and for then forcing the operating member, shank and closed shears downwardly as a single unit to cause said closed shears to downwardly continue said initial slit, whereby the can wall may be quickly and easily split by placing the shears astride the upper edge of said wall and downwardly pushing said hand grip.

2. A structure as specified in claim 1; said cutting edges comprising a pair of cooperable longitudinal cutting edges disposed one on each of said shear blades for snipping the initial slit through the upper end of the can wall, and a pair of short downwardly facing cutting edges disposed one on the lower end of each blade, said short downwardly facing cutting edges being disposed at obtuse angles to said longitudinal cutting edges and jointly forming a V-shaped cutter when said blades are closed to form the initial slit, said V-shaped cutter being operable, upon downward pushing of the shears, to downwardly continue said slit.

3. A structure as specified in claim 1; said cutting edges comprising a pair of cooperable longitudinal cutting edges disposed one on each of the shear blades for snipping the initial slit in the upper end of the can wall, and two short downwardly diverging cutting edges on the lower end of one blade for downwardly continuing said initial slit when the closed shears are downwardly pushed, one of said short cutting edges extending to the longitudinal cutting edge of said one blade to pass through the initial slit as said longitudinal edges complete said initial slit.

4. In a pair of shears of the general type having two pivotally connected blades and means whereby they may be opened and closed; a pair of cooperable longitudinal cutting edges disposed one on each of said blades for initially snipping a slit through a piece of sheet material; and a pair of short oblique cutting edges disposed one on the free end of each blade and jointly forming a V-shaped cutter when said blades are closed to form the initial slit, said V-shaped cutter being operable, upon pushing the closed shears, to continue said initial slit; whereby closing the shears once upon the material and then pushing said shears will enable the operator to form a slit of desired length.

5. In a pair of shears of the general type having two pivotally connected blades and means whereby they may be opened and closed; a pair of cooperable longitudinal cutting edges disposed one on each of said blades for initially snipping a slit through a piece of sheet material; and two short diverging cutting edges on the end of one blade for continuing the initial slit when the closed shears are pushed, one of said short cutting edges extending to the longitudinal edge of said one blade to pass through the initial slit as said longitudinal cutting edges complete said initial slit; whereby closing the shears once upon the material and then pushing said shears will enable the operator to cut a slit of desired length.

CALHOUN COLLINS.